US012124755B2

(12) United States Patent
Sakata et al.

(10) Patent No.: US 12,124,755 B2
(45) Date of Patent: Oct. 22, 2024

(54) DISPLAY CONTROL DEVICE AND DISPLAY CONTROL METHOD

(71) Applicant: Mitsubishi Electric Corporation, Tokyo (JP)

(72) Inventors: Reiko Sakata, Tokyo (JP); Tatsunari Kataoka, Tokyo (JP); Naoki Furuhata, Tokyo (JP); Saki Matsui, Tokyo (JP); Atsushi Shimada, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 0 days.

(21) Appl. No.: 18/243,678

(22) Filed: Sep. 8, 2023

(65) Prior Publication Data
US 2023/0418536 A1 Dec. 28, 2023

Related U.S. Application Data

(63) Continuation of application No. PCT/JP2021/014560, filed on Apr. 6, 2021.

(51) Int. Cl.
G06F 3/14 (2006.01)
G06F 3/01 (2006.01)
(Continued)

(52) U.S. Cl.
CPC ............... G06F 3/14 (2013.01); G06F 3/017 (2013.01); G06F 3/0482 (2013.01); H04N 5/74 (2013.01)

(58) Field of Classification Search
CPC .. G06F 3/0482; G06F 3/04845; G06F 3/0486; G06F 3/04842
See application file for complete search history.

(56) References Cited

U.S. PATENT DOCUMENTS 11,921,993 B2 * 3/2024 Tyler ..................... G06F 3/0483
2014/0176599 A1 6/2014 Watanabe et al.
(Continued)

FOREIGN PATENT DOCUMENTS

JP 2004-021514 A 1/2004
JP 2007-149053 A 6/2007
(Continued)

OTHER PUBLICATIONS

International Search Report and Written Opinion mailed on May 25, 2021, received for PCT Application PCT/JP2021/014560, filed on Apr. 6, 2021, 8 pages including English Translation.
(Continued)

Primary Examiner — Van N Chow
(74) Attorney, Agent, or Firm — XSENSUS LLP

(57) ABSTRACT

A display control device includes: processing circuitry that sets a display content projected by a projector in such a manner that a first display object is displayed in a first display area; and that receives a signal detected by a detection sensor from the detection sensor and determines whether or not the first display object is selected by a user. The processing circuitry sets another display content projected by the projector in such a manner that a second display object corresponding to the first display object is displayed in a second display area different from the first display area in a case where it is determined that the first display object is selected, and determines whether or not the second display object is selected, and settles the determination that the first display object is selected in a case where the processing circuitry determines that the second display object is selected.

19 Claims, 10 Drawing Sheets

(51) Int. Cl.
*G06F 3/0482* (2013.01)
*H04N 5/74* (2006.01)

(56) References Cited

U.S. PATENT DOCUMENTS

| | | |
|---|---|---|
| 2016/0350621 A1 | 12/2016 | Watanabe et al. |
| 2019/0138859 A1 | 5/2019 | Watanabe et al. |
| 2020/0005099 A1 | 1/2020 | Watanabe et al. |
| 2020/0326839 A1* | 10/2020 | Walkin ................ G06F 3/04883 |
| 2021/0286510 A1* | 9/2021 | Tyler ..................... G06F 3/0483 |
| 2023/0139626 A1* | 5/2023 | Berliner ............... G06F 1/1694 |
| | | 345/156 |
| 2023/0139932 A1* | 5/2023 | Xia ...................... G06F 3/0488 |
| | | 715/734 |

FOREIGN PATENT DOCUMENTS

| | | |
|---|---|---|
| JP | 2008-026653 A | 2/2008 |
| JP | 2014-123277 A | 7/2014 |
| JP | 2020-010888 A | 1/2020 |

OTHER PUBLICATIONS

Notice of Reasons for Refusal mailed on Sep. 7, 2021, received for JP Application 2021-541024, 5 pages including English Translation.
Notice of Reasons for Refusal mailed on Nov. 16, 2021, received for JP Application 2021-541024, 4 pages including English Translation.

* cited by examiner

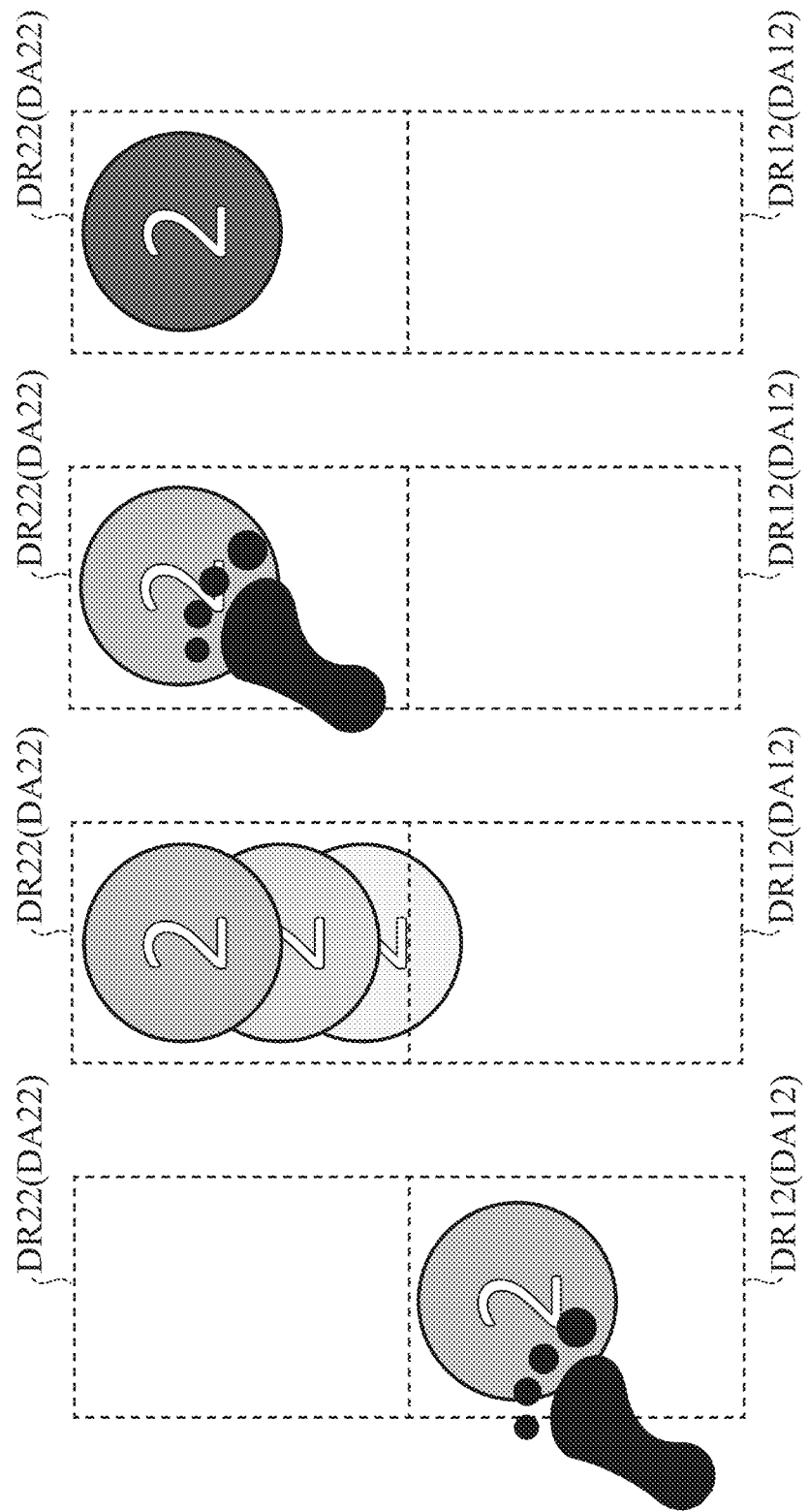

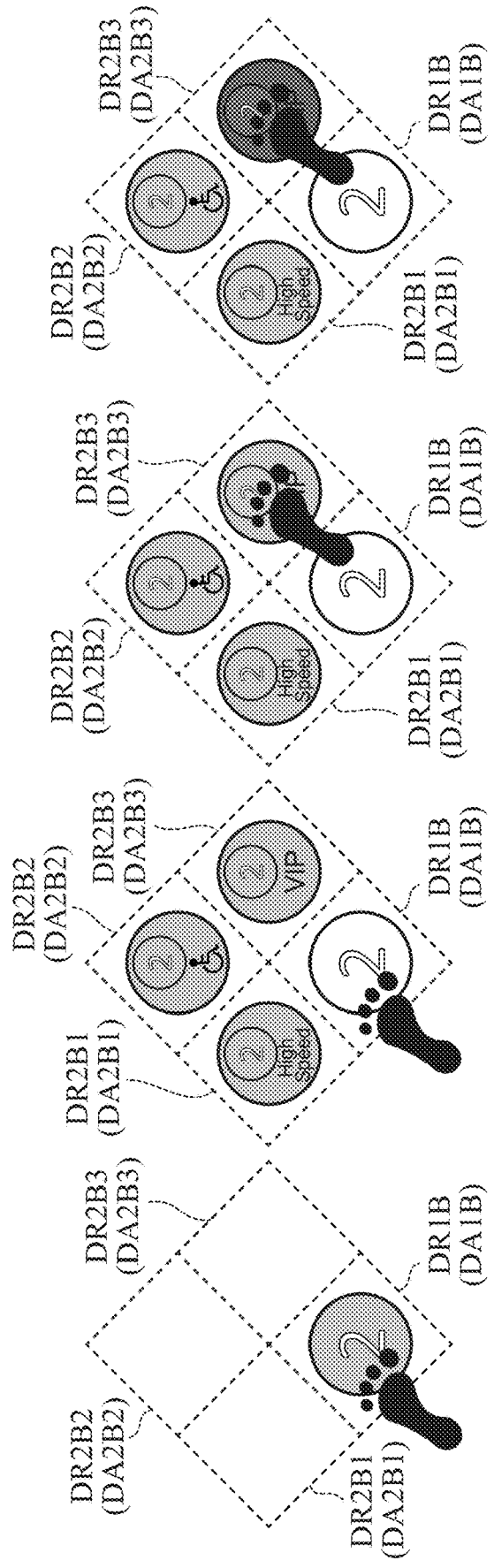

DISPLAY CONTROL DEVICE AND DISPLAY CONTROL METHOD

CROSS-REFERENCE TO RELATED APPLICATION

The present application is a continuation of International Application No. PCT/JP2021/014560, filed Apr. 6, 2021, which is incorporated herein by reference in its entirety.

TECHNICAL FIELD

The present disclosure relates to a display control technique.

BACKGROUND ART

In order to provide guiding information, there is a technique of displaying a display object on a surface of a structure, such as a floor surface or a wall surface. For example, Patent Literature 1 below discloses a technique of projecting a plurality of destinations and arrows indicating directions of the respective destinations on a floor surface in front of a person, and further projecting a display object for guiding in response to a motion in which the person steps on any one of the arrows.

CITATION LIST

Patent Literature

Patent Literature 1: JP 2014-123277 A

SUMMARY OF INVENTION

Technical Problem

However, according to conventional techniques including Patent Literature 1, when a selection motion of selecting a display object is performed by an object (hereinafter, also referred to as "user") such as a person, a motion of selecting the display object is settled. Therefore, there is a problem that a system performs a following operation against the user's intention in a case where a detected selection motion is against the user's intention.

The present disclosure has been made in order to solve such a problem, and an object of an aspect of embodiments is to provide a display control device capable of preventing an operation against a user's intention from being performed.

Solution to Problem

According to an aspect of a display control device of embodiments, a display control device includes: processing circuitry:
to set a display content projected by a projector in such a manner that a first display object is displayed in a first display area; and
to receive a signal detected by a detection sensor from the detection sensor and to determine whether or not the first display object is selected by a user, wherein
the processing circuitry sets another display content projected by the projector in such a manner that at least one second display object corresponding to the first display object and perceivable of information of the first display object is displayed in a second display area different from the first display area in a case where it is determined that the first display object is selected, and the processing circuitry determines whether or not the at least one second display object is selected, and settles the determination that the first display object is selected in a case where the at least one second display object is determined to be selected.

Advantageous Effects of Invention

According to an aspect of a display control device of the embodiments, it is possible to prevent an operation against a user's intention from being performed.

BRIEF DESCRIPTION OF DRAWINGS

FIGS. 8A to 8D are diagrams illustrating a series of flows indicating that a display content and a detection region (display area) are changed by a user performing a gesture of stepping on a display object with a foot. FIG. 8A is a diagram illustrating that a person who is an object has performed a gesture of touching a display object representing a numeral 2 projected on a detection region DR12 with a foot. FIG. 8B is a diagram illustrating a content projected following the touch motion in FIG. 8A, and is a diagram illustrating a state in which the display object representing the numeral 2 moves from the detection region DR12 to a detection region DR22. FIG. 8C is a diagram illustrating that the person has performed a gesture of touching the display object of the numeral 2 displayed in the detection region DR22 again with a foot. FIG. 8D is a diagram illustrating a content projected following the touch motion in FIG. 8C, and is a diagram illustrating that the display object of the numeral 2 is highlighted in order to indicate that a motion of selecting the numeral 2 has been completed.

FIGS. 9A to 9D are diagrams illustrating modifications of the display content and the detection region (display area).

DESCRIPTION OF EMBODIMENTS

Figure 1:
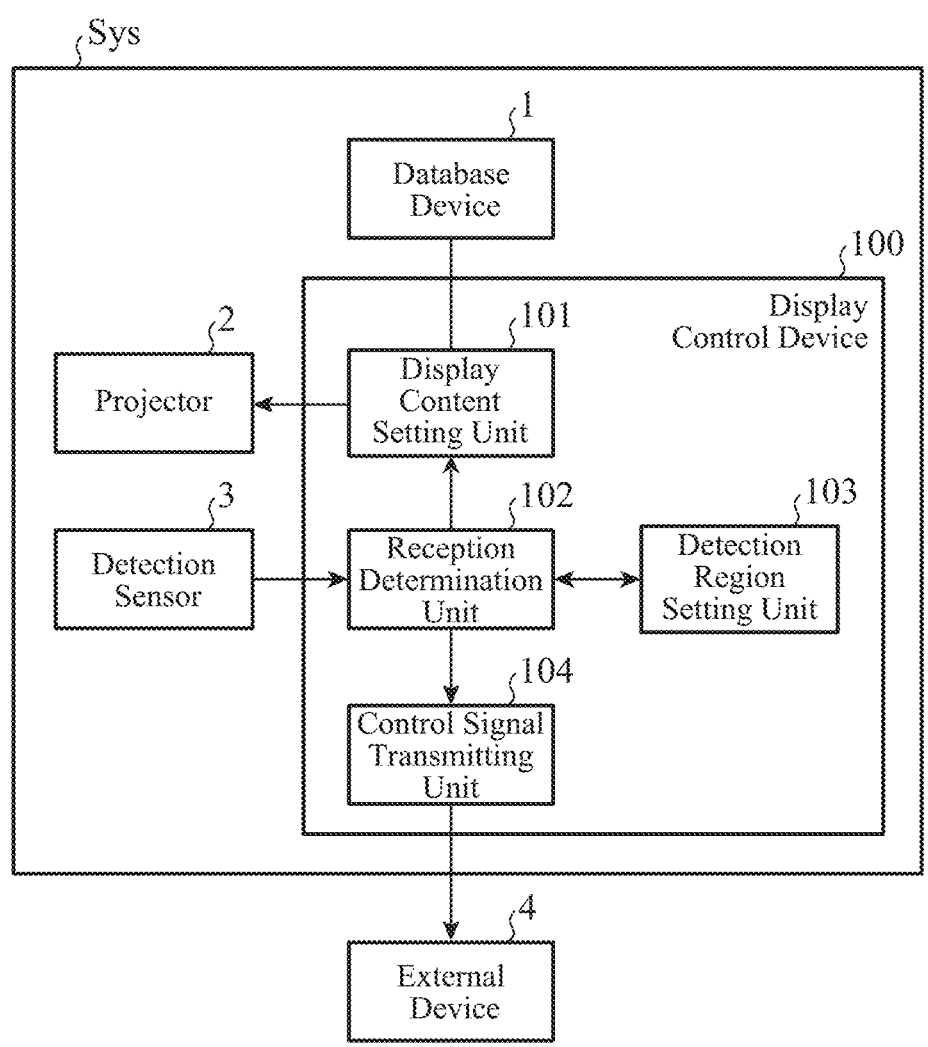
FIG. 1 is a block diagram illustrating configurations of a display control system and a display control device.

Hereinafter, various embodiments in the present disclosure will be described in detail with reference to the attached drawings. Note that constituent elements denoted by the same reference numeral throughout the drawings have the same or similar configuration or the same or similar function.

First Embodiment

<Configuration>

Hereinafter, a display control device 100 according to a first embodiment will be described with reference to FIGS. 1 to 10C. As illustrated in FIG. 1, a display control system Sys includes, as an example, the display control device 100, a database device 1, a projector 2, and a detection sensor 3. Instead of the projector 2, a display device (not illustrated) such as an LED display may be used. Hereinafter, a case where the projector 2 is used will be described.

The database device 1 includes a database storing contents to be projected by the projector 2, and the display control device 100 acquires a content by referring to the database device 1. The display control device 100 outputs the acquired content to the projector 2, and the projector 2 projects the content input from the display control device 100. The detection sensor 3 detects a signal in a predetermined detection region and outputs the detected signal to the display control device 100. The display control device 100 determines whether or not an object is present in a predetermined detection region, and performs processing depending on a determination result. For example, in a case where a certain display object is displayed, when the display control device 100 detects an object in a predetermined detection region, the display control device 100 acquires a content to be displayed next from the database device 1 and outputs the acquired content to the projector 2. Alternatively, in a case where another display object is displayed, when the display control device 100 detects an object in another predetermined detection region, the display control device 100 outputs a control signal for controlling an external device 4 to the external device 4.

Figure 2:
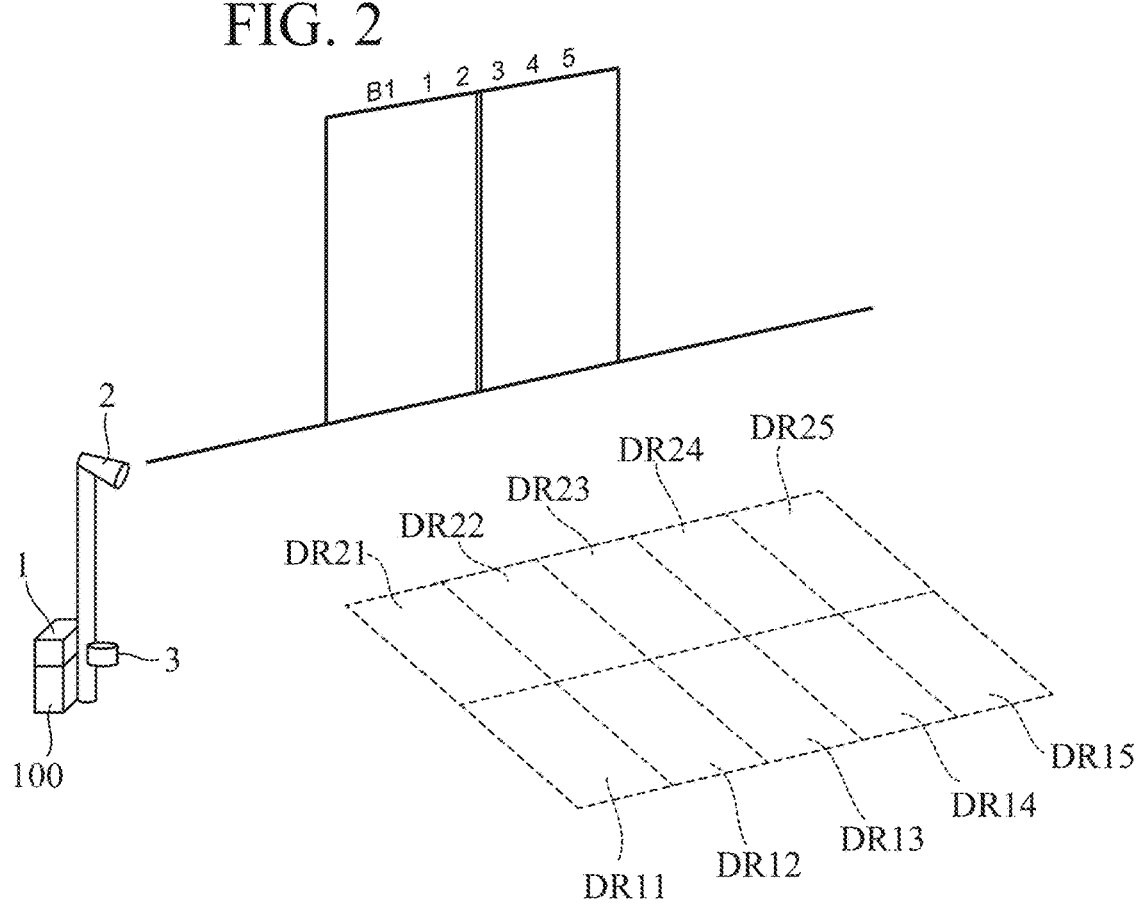
FIG. 2 is a diagram illustrating an arrangement example of constituent units of the display control system and a setting example of a detection region.

In a case where the external device 4 is an elevator control device, the display control device 100, the database device 1, the projector 2, and the detection sensor 3 are arranged, for example, as illustrated in FIG. 2. FIG. 2 is a diagram illustrating an arrangement example of the display control device 100, the database device 1, the projector 2, and the detection sensor 3 and a setting example of a detection region detected by the detection sensor 3 in an elevator hall of the first basement of a certain building in a case where the external device 4 is an elevator control device. The display control device 100, the database device 1, the projector 2, and the detection sensor 3 may be arranged on a wall surface or a ceiling surface of the elevator hall instead of being arranged as an independent integrated unit as illustrated in FIG. 2. The detection region is illustrated as a two-dimensional detection region in FIG. 2, but may be set as a three-dimensional detection region. Note that, in a case where a display device is used instead of the projector 2, the display device is disposed, for example, on or within a floor surface of the elevator hall.

Figure 3:
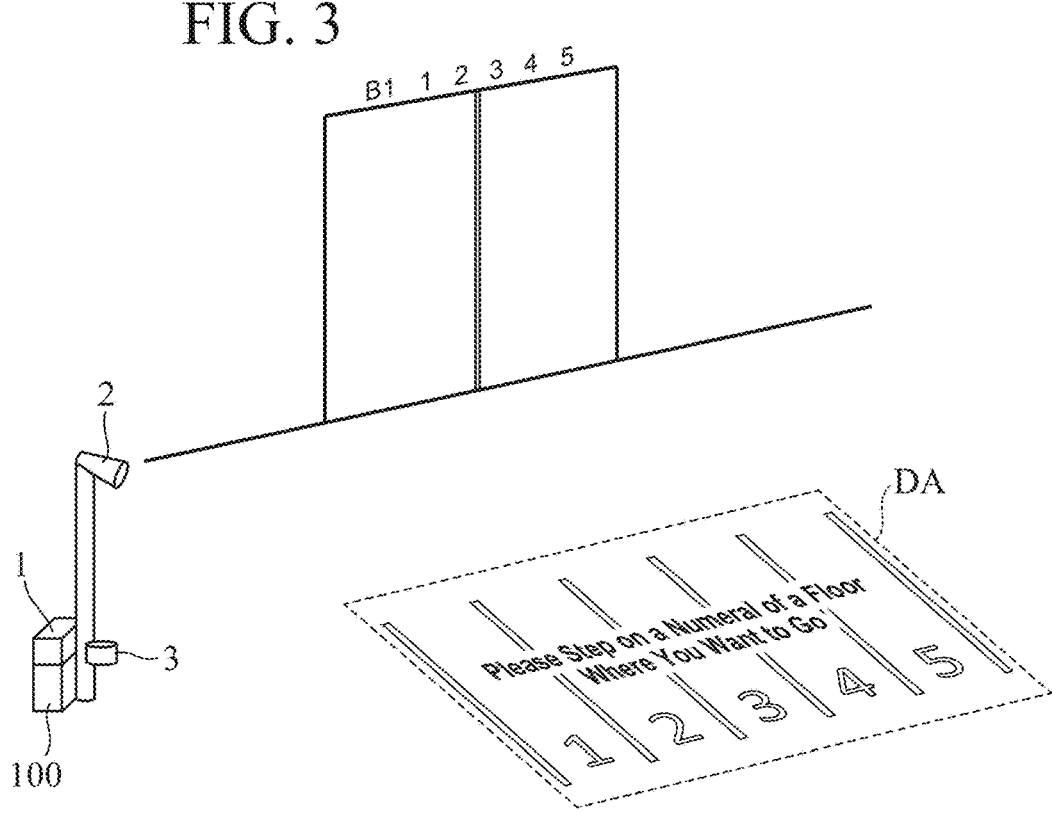
FIG. 3 is a diagram illustrating a display example by a projector.
Figure 4:
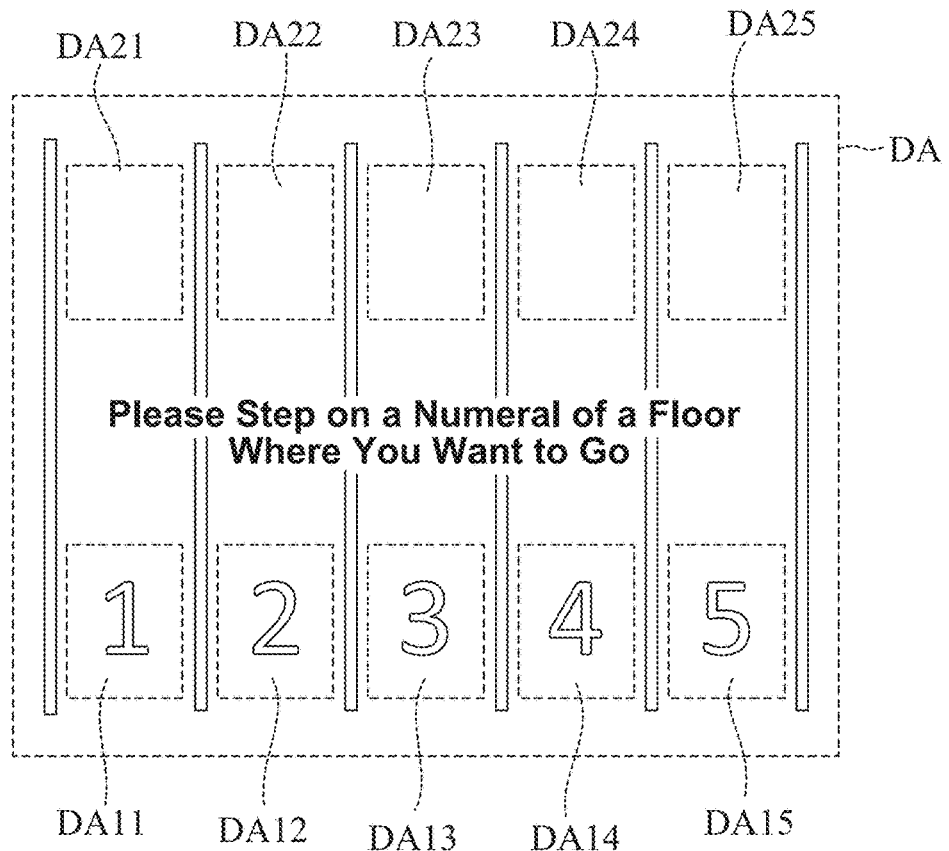
FIG. 4 is a diagram illustrating a plurality of display areas.

The projector 2 projects a display object such as a destination floor of the elevator in a display area DA of the floor surface of the elevator hall as illustrated in FIG. 3, for example, and the detection sensor 3 detects an object in a detection region. In the example of FIG. 3, numerals 1 to 5 each representing a destination floor of the elevator, a plurality of lines evoking lanes corresponding to the respective numerals, and a guiding text "[p]lease step on a numeral of a floor where you want to go" are displayed in the display area DA. In order to identify an area in which a display object is displayed, as illustrated in FIG. 4, an area in which a display object "1" is displayed is referred to as display area DA11, an area in which a display object "2" is displayed is referred to as a display area DA12, an area in which a display object "3" is displayed is referred to as a display area DA13, an area in which a display object "4" is displayed is referred to as a display area DA14, and an area in which a display object "5" is displayed is referred to as a display area DA15. In addition, display areas opposite the display areas DA11 to DA15 with reference to the guiding text "[p]lease step on a numeral of a floor where you want to go" are referred to as display areas DA21 to DA25. A numeral immediately after the letters "DA" indicates the number of times of display. For example, DA1 indicates a region in which the first display is performed, and DA2 indicates a region in which the second display is performed. In addition, a numeral immediately after DA1 is a number for distinguishing a plurality of areas in which the first display is performed from each other, and a numeral immediately after DA2 is a number for distinguishing a plurality of areas in which the second display can be performed from each other. The plurality of display areas DA11 to DA15 forms a first group of display areas, and the plurality of display areas DA21 to DA25 forms a second group of display areas.

The detection sensor 3 detects an object in a predetermined detection region and outputs a detection signal to the display control device 100. Examples of the detection sensor 3 include a laser scanner also referred to as a laser range scanner, an infrared sensor, and an imaging camera. In the above-described example in which the external device 4 is an elevator control device, for example, as illustrated in FIG. 2, a plurality of detection regions DR11 to DR15 and DR21 to DR25 are set as predetermined detection regions. As in the case of the display area DA, a numeral immediately after the letters "DR" indicates the number of times of detection, and a numeral immediately after DR1 or DR2 indicates a number for distinguishing a plurality of regions in which the first or second detection is performed from each other. In order to accurately perform detection, a non-detection region in which detection is not performed may be disposed between the detection regions. In addition, a relationship between the display area and the detection region may be adjusted in order to make a display object easily visible to a user heading for the elevator. For example, the detection regions DR11 to DR15 may be set so as to include a fore region, which is not included in the display areas DA11 to DA15 in which the display objects "1" to "5" are displayed and is located in front of the display areas DA11 to DA15 when viewed from a user heading for the elevator. The plurality of detection regions DR11 to DR15 forms a first group of detection regions, and the plurality of detection regions DR21 to DR25 forms a second group of detection regions.

Hereinafter, a detailed configuration of the display control device 100 in a case where the example of the external device 4 is such an elevator control device as described above will be described. The display control device 100 includes a display content setting unit 101, a reception determination unit 102, a detection region setting unit 103, and a control signal transmitting unit 104.

(Display Content Setting Unit)

The display content setting unit 101 is a functional unit that sets a content projected by the projector 2 depending on a state signal input from the reception determination unit 102. The state signal represents a state corresponding to a content detected by the detection sensor 3. The state corresponding to a detection content includes, for example, a standby state in which an object is not detected by the detection sensor 3, a first state in which an object is detected in the first group of detection regions by the detection sensor 3, a state in which an object is not detected in the first group of detection regions by the detection sensor 3, a second state in which an object is detected in the second group of detection regions by the detection sensor 3, and a state in which an object is not detected in the second group of detection regions by the detection sensor 3. In addition, the first state is subdivided into five states corresponding to the detection regions DR11 to DR15. Similarly, the second state is subdivided into five states corresponding to the detection regions DR21 to DR25. As described above, the state includes various states, and the state signal is a signal corresponding to one of the various states.

The display content setting unit 101 acquires a content from the database device 1 depending on the state signal, and outputs the acquired content to the projector 2. The projector 2 projects the content input from the display content setting unit 101. By the projection of the projector 2, for example, display objects such as the destination floors of the elevator and the guiding text for asking a user of the elevator to perform a motion as illustrated in FIG. 3 are displayed.

(Reception Determination Unit)

The reception determination unit 102 receives a detection signal of a detection region from the detection sensor 3, and determines whether or not an object is present in the detection region. More specifically, as a first step, the reception determination unit 102 receives a signal detected by the detection sensor 3 from the detection sensor 3, and determines which of a plurality of display objects displayed in the display areas DA11 to DA15 has been selected by a user who is the object. Hereinafter, the determination performed for this first-stage display is referred to as "first determination". Furthermore, in a case where a result of the first determination indicates that any one of the plurality of display objects displayed in the display areas DA11 to DA15 has been selected by the user, the reception determination unit 102 determines, as a second step, whether a display object displayed in any one of the display areas DA21 to DA25 has been selected by the user depending on the selected display object. Hereinafter, the determination performed for the second-stage display is referred to as "second determination". Furthermore, in a case where a result of the second determination indicates that a display object displayed in any one of the display areas DA21 to DA25 has been selected by the user, the reception determination unit 102 determines that the result of the first determination is correct and settles the result of the first determination. For example, in a case where the result of the first determination indicates that a display object displayed in the display area DA11 has been selected by a user, when the result of the second determination indicates that a display object displayed in the display area DA21 has been selected by the user, the reception determination unit 102 settles a result of the determination that the display object displayed in the display area DA11 has been selected by the user. Furthermore, in a case where the result of the first determination is settled, the reception determination unit 102 performs predetermined processing on the basis of the result of the second determination. Hereinafter, description will be made with reference to the drawings. Note that, as described later with reference to FIGS. 9A to 9D, a plurality of display areas and a plurality of display objects may be disposed for the second-stage display depending on a display object selected in the first stage.

The reception determination unit 102 receives a detection signal of a detection region from the detection sensor 3. In a case where a laser range scanner is used as the detection sensor 3, the reception determination unit 102 outputs a request signal for requesting detection signals of one or more detection regions to the detection sensor 3, and receives the detection signals of the detection regions from the detection sensor 3. For example, the reception determination unit 102 requests a detection signal of the first group of detection regions including the detection regions DR1 to DR5 from the detection sensor 3, and receives the detection signal of each of the detection regions. In a case where an infrared sensor is used as the detection sensor 3, a detection signal of each of the detection regions is received using an infrared sensor corresponding to each of the detection regions.

Whether or not an object is present in a predetermined detection region can be determined by detecting a difference between a reference and detection data obtained from a detection signal using data in a case where an object is not present as the reference. In a case where the reception determination unit 102 requests detection data of the above-described first group of detection regions from the detection sensor 3, the reception determination unit 102 determines whether or not an object is present in any one of the detection regions DR1 to DR5. For example, in a case where a user performs a motion of stepping on the display of "1" in FIG. 3, it is determined that an object is present in the detection region DR1 in FIG. 2 set in association with the display object "1". The displayed guiding text in the example of FIG. 3 requires a motion of stepping on a numeral of a destination floor, but the motion does not need to be limited to the motion of stepping as an actual motion of a user. An electromagnetic wave such as a laser is reflected by a motion of standing on a numeral, a motion of moving onto a numeral with a wheelchair, or the like, and a reflected wave is detected by the detection sensor 3. Even in the cases of these motions, the reception determination unit 102 may determine that an object is present in the detection region.

The reception determination unit 102 determines whether an object is present in the detection region on the basis of the received detection data, and then performs predetermined processing depending on a determination result. The reception determination unit 102 performs, for example, the following processing depending on the determination result. As an example, in a case where the reception determination unit 102 determines that an object is present in any detection region included in the first group of detection regions, the reception determination unit 102 outputs a signal indicating a detection region (hereinafter, referred to as "first detection region") in which it is determined that an object is present to the detection region setting unit 103, acquires information indicating a detection region (hereinafter, referred to as "second detection region") in which next display is to be performed from the detection region setting unit 103, and outputs a corresponding state signal to the display content setting unit 101. Note that the second detection region means, for example, a region different from the first detection region. Here, the term "different" means that regions to be compared are not the same. Therefore, the expression that the second detection region is different from the first detection region includes a case where the second detection region and the first detection region partially overlap with each other in addition to a case where the second detection region and the first detection region do not overlap with each other at all.

As another example, in a case where the reception determination unit 102 determines that an object is not present in the first group of detection regions, the reception determination unit 102 outputs a signal indicating the first group of detection regions to the display content setting unit 101 in order to continue the current projection in the first group of detection regions.

As still another example, in a case where the reception determination unit 102 determines that an object is present in the second detection region included in the second group of detection regions, the reception determination unit 102 settles a selection motion in the first detection region, and outputs a signal corresponding to a detection content in the second detection region to the control signal transmitting unit 104. When the reception determination unit 102 determines that an object is present in the second detection region in this manner, the reception determination unit 102 may output a corresponding state signal to the display content setting unit 101 in order to notify the user that the detection in the second detection region has been performed validly.

As further still another example, in a case where the reception determination unit 102 determines that an object is not present in the second detection region, the reception determination unit 102 outputs a signal indicating that an object is not present in the second detection region to the detection region setting unit 103, acquires a detection region in which next display is to be performed from the detection region setting unit 103, and outputs a corresponding state signal to the display content setting unit 101.

(Detection Region Setting Unit)

The detection region setting unit 103 sets a valid detection region for detecting an object as a valid detection region. The detection region may be a two-dimensional region or a three-dimensional region. The detection region setting unit 103 holds a table (not illustrated) in which an input signal from the reception determination unit 102 is associated with a detection region to be set. The detection region setting unit 103 sets the valid detection region by referring to the table and selecting one or more detection regions depending on the input from the reception determination unit 102. For example, in a case where a standby signal indicating that an object has been detected in a predetermined region by a sensor (not illustrated) is input to the detection region setting unit 103 via the reception determination unit 102, the detection region setting unit 103 sets one or more detection regions as valid detection regions. In a case where a signal indicating that an object has been detected in the valid detection region is input to the detection region setting unit 103 from the reception determination unit 102, the detection region setting unit 103 sets another detection region different from the detection region as a valid detection region. In the example of FIG. 2, in a case where a standby signal is input, the detection region setting unit 103 sets the detection regions DR11 to DR15 as valid detection regions. In addition, in the example of FIG. 2, in a case where an object is detected in any one of the detection regions DR11 to DR15, the detection region setting unit 103 sets any one of the detection regions DR21 to DR25 as a valid detection region. In a case where an object is detected in the detection region DR11, the detection region DR21 is set as a valid detection region. In a case where an object is detected in the detection region DR12, the detection region DR22 is set as a valid detection region. In a case where an object is detected in the detection region DR13, the detection region DR23 is set as a valid detection region. In a case where an object is detected in the detection region DR14, the detection region DR24 is set as a valid detection region. In a case where an object is detected in the detection region DR15, the detection region DR25 is set as a valid detection region. The detection region setting unit 103 outputs data representing the set detection region to the reception determination unit 102, and the reception determination unit 102 outputs a state signal corresponding to the input data to the display content setting unit 101.

In addition, when the detection region setting unit 103 sets any one of the detection regions DR21 to DR25 as a valid detection region, the detection region setting unit 103 may cancel the detection regions DR11 to DR15 from the valid detection region. That is, setting may be performed in such a manner that detection in the detection regions DR11 to DR15 is not performed. As described above, in a case where it is determined that any one of the display objects displayed in the display areas DA11 to DA15 has been selected (that is, the first display object has been selected) by detection of an object in any one of the detection regions DR11 to DR15, the detection region setting unit 103 may switch the valid detection region from the first group of detection regions including the detection regions DR11 to DR15 to the second detection region (any one of the detection regions DR21 to DR25). By switching the detection region in this manner, it is possible to prevent detection not assumed by the system. For example, continuous detection in the detection regions DR11 to DR15 can be prevented.

When the detection region setting unit 103 receives a signal indicating that an object is not present in the second detection region from the reception determination unit 102, the detection region setting unit 103 sets the first group of detection regions as a valid detection region.

(Control Signal Transmitting Unit)

The control signal transmitting unit 104 outputs a signal for controlling the external device 4 to the external device 4 depending on a content of a signal input from the reception determination unit 102.

Figure 5A:
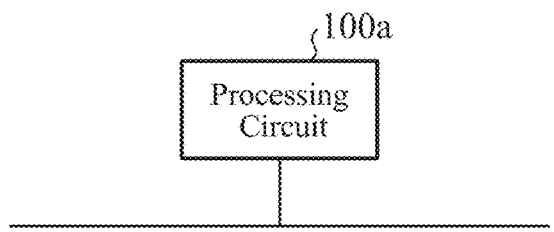
FIG. 5A is a diagram illustrating a configuration example of hardware of the display control device.
Figure 5B:
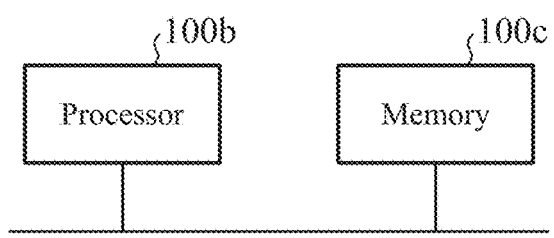
FIG. 5B is a diagram illustrating a configuration example of hardware of the display control device.

Next, a configuration example of hardware of the display control device 100 will be described with reference to FIGS. 5A and 5B. FIGS. 5A and 5B are each a diagram illustrating a configuration example of hardware of the display control device 100. As an example, as illustrated in FIG. 5A, the display control device 100 includes a processing circuit 100a, and functional units of the display content setting unit 101, the reception determination unit 102, the detection region setting unit 103, and the control signal transmitting unit 104 are implemented by the processing circuit 100a. As another example, as illustrated in FIG. 5B, the display control device 100 includes a processor 100b and a memory 100c, and the functional units of the display content setting unit 101, the reception determination unit 102, the detection region setting unit 103, and the control signal transmitting unit 104 are implemented by the processor 100b reading and executing a program stored in the memory 100c.

<Operation>

Figure 6:
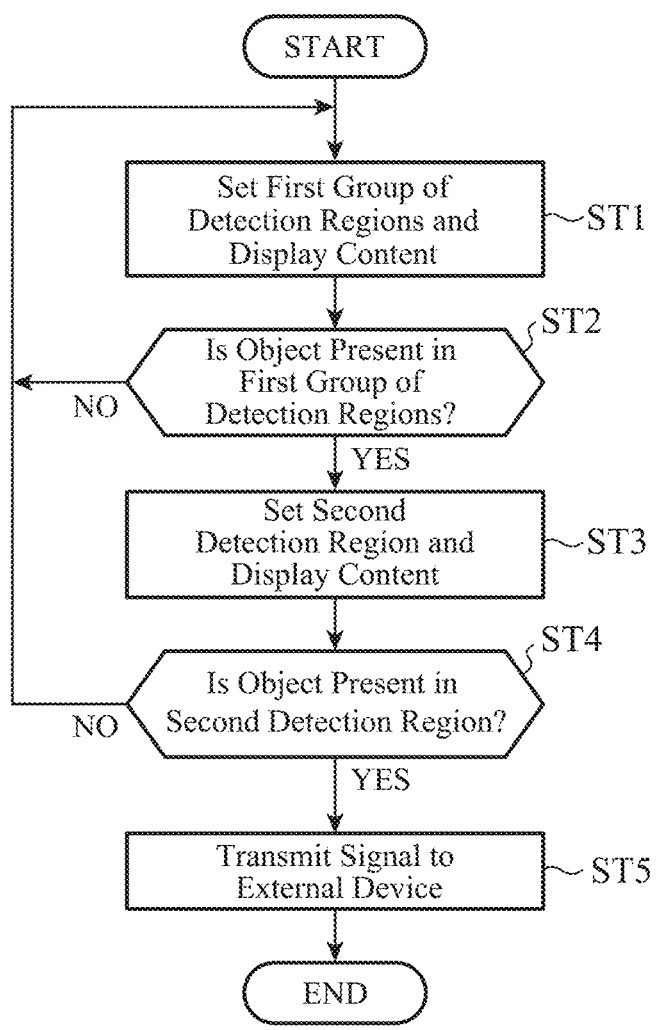
FIG. 6 is a flowchart illustrating an operation of the display control device.
Figure 10A:
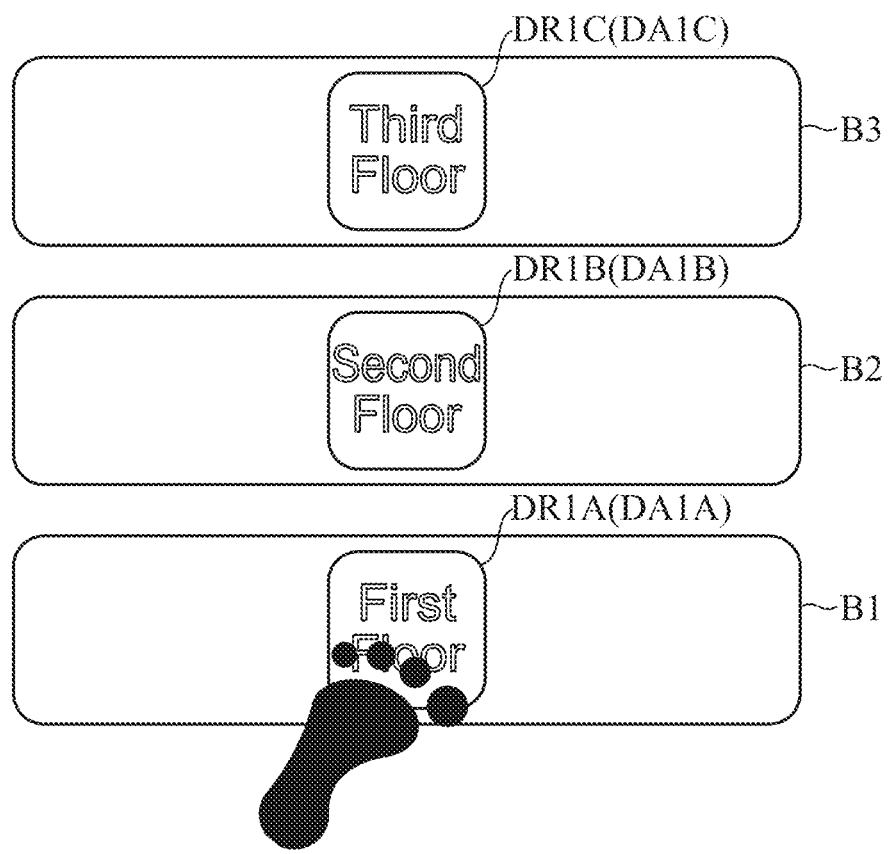
FIG. 10A is a diagram illustrating modifications of the display content and the detection region (display area).
Figure 10B:
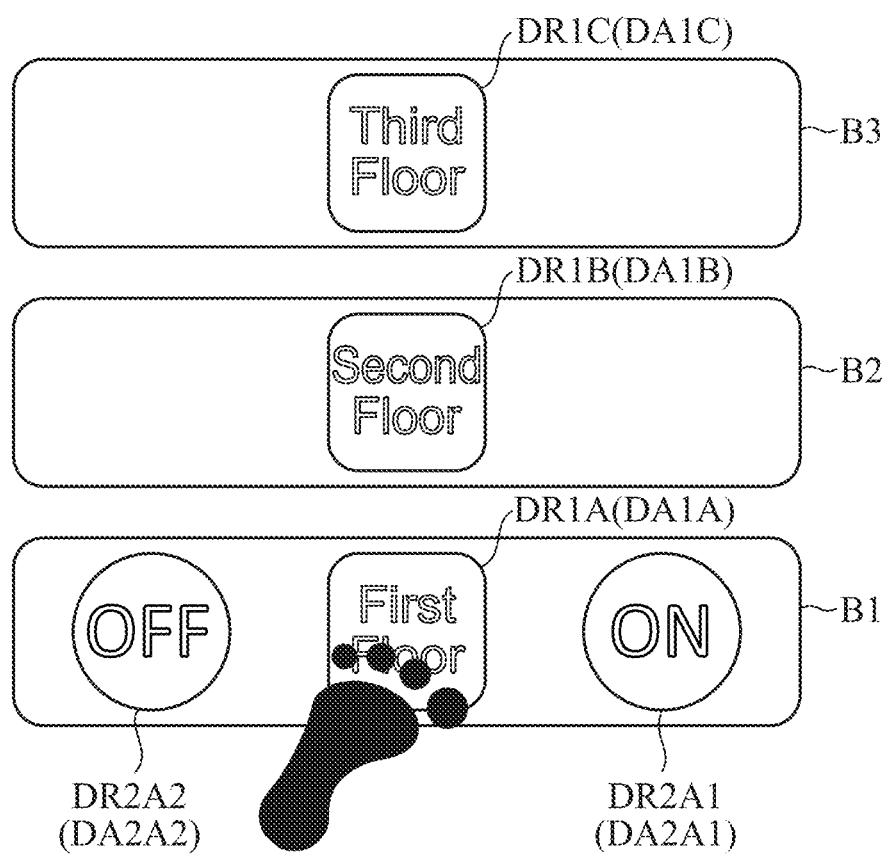
FIG. 10B is a diagram illustrating modifications of the display content and the detection region (display area).
Figure 10C:
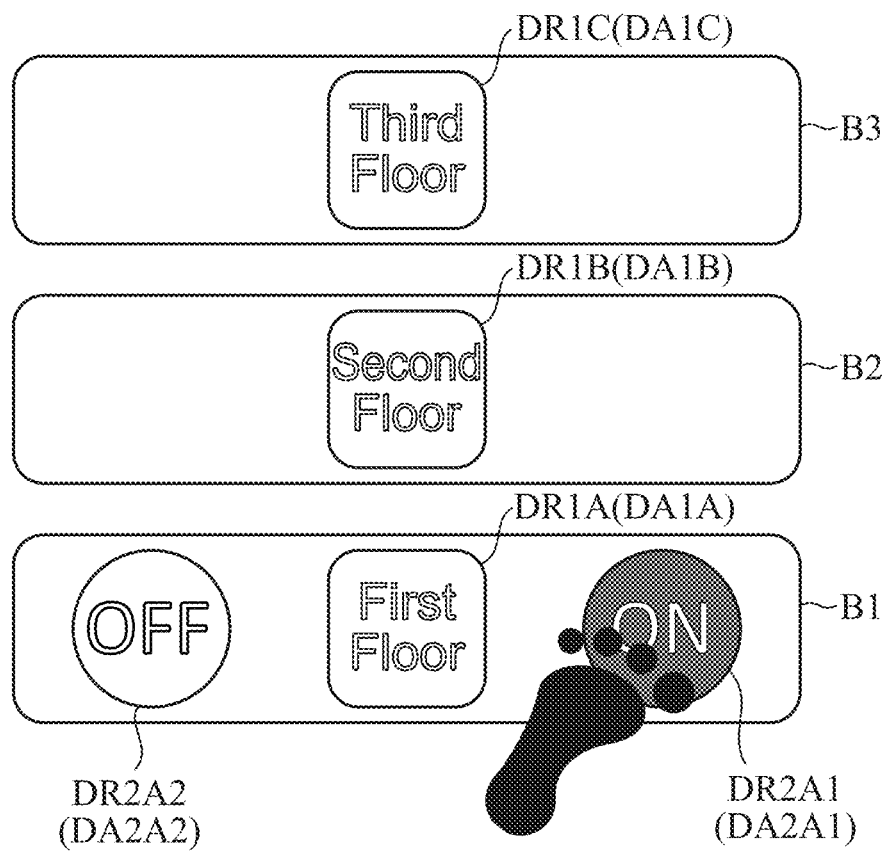
FIG. 10C is a diagram illustrating modifications of the display content and the detection region (display area).

Hereinafter, an operation of the display control device 100 will be described with reference to FIGS. 6 to 10C. FIG. 6 is a flowchart illustrating the operation of the display control device 100, and the flow of FIG. 6 is started, for example, by an object being detected in a predetermined region by a sensor (not illustrated) and a standby signal being input to the display control device 100. FIGS. 7A to 7E are diagrams for describing the operation of the display control device, and supplementarily describe the flow of the operation illustrated by the flowchart of FIG. 6. FIGS. 8A to 8D are diagrams illustrating that a display content and a detection region are changed by a user performing a gesture of stepping on a display object with a foot. FIGS. 9A to 9D are diagrams illustrating modifications of the display content and the detection region. FIGS. 10A to 10C are diagrams illustrating modifications of the display content and the detection region (display area).

Figure 7A:
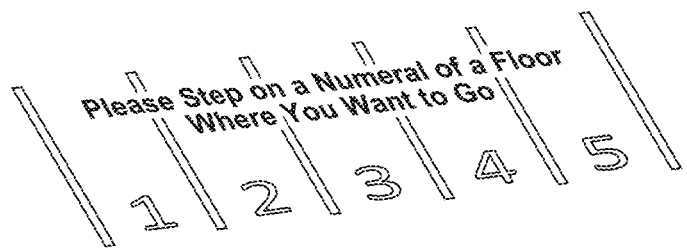
FIGS. 7A to 7E are diagrams for describing the operation of the display control device.

In step ST1 of FIG. 6, the detection region setting unit 103 sets the first group of detection regions and outputs data indicating the set first group of detection regions to the reception determination unit 102. For example, the detection region setting unit 103 sets the first group of detection regions including the detection regions DR11 to DR15, and outputs data indicating the set first group of detection regions to the reception determination unit 102. In addition, the display content setting unit 101 sets a display content on the basis of the set first group of detection regions. For example, the display content setting unit 101 sets a display content in such a manner that display as illustrated in FIG. 7A is performed. The set display content is output to the projector 2, and projected by the projector 2. As a result, as illustrated in FIG. 7A (see also FIG. 4), a display object "1" is displayed in the display area DA11, a display object "2" is displayed in the display area DA12, a display object "3" is displayed in the display area DA13, a display object "4" is displayed in the display area DA14, and a display object "5" is displayed in the display area DA15.

Figure 7B:
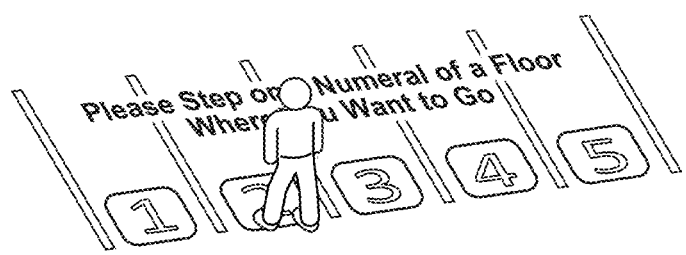

In step ST2, the reception determination unit 102 determines whether or not an object is present in the first group of detection regions on the basis of a signal from the detection sensor 3. That is, the reception determination unit 102 determines which of the display objects displayed in the display areas DA11 to DA15 has been selected by a user. For example, as illustrated in FIG. 7B (see also FIG. 2), the reception determination unit 102 determines whether the destination floor "2" displayed in the display area DA12 has been selected by determining whether a user of the elevator is present in the detection region DR12.

If YES in step ST2, in step ST3, the detection region setting unit 103 sets a second detection region different from the first detection region and outputs the set second detection region to the reception determination unit 102. For example, in a case where it is determined that an object is present in the detection region DR12, detection region setting unit 103 sets the detection region DR22 as the second detection region, and outputs the set second detection region to the reception determination unit 102.

In addition, the display content setting unit 101 sets another display content on the basis of the set second detection region. For example, the display content setting unit 101 sets a display content in such a manner that animation as illustrated in FIG. 8B is performed. FIG. 8B illustrates a state in which the display object "2" moves to another display area (display area DA22) in a case where an object is detected in the detection region DR12 as illustrated in FIG. 8A. The set display content is output to the projector 2, and projected by the projector 2. As a result, as illustrated in FIG. 8B (see also FIG. 4), animation is performed and the display object "2" is displayed in the display area DA22.

The content of the second display object displayed in the second display area (any one of the display areas DA21 to DA25) on the basis of setting of the second detection region is illustrated as the same display object in FIG. 8B. However, the second display object may be displayed in various modes as long as information of the display object displayed in the first display area (any one of the display areas DA11 to DA15) can be perceived. For example, as illustrated in FIG. 9B, in each of second display areas DA2B1 to DA2B3 disposed corresponding to detection regions DR2B1 to DR2B3 on the basis of setting of the detection regions DR2B1 to DR2B3 as the second display areas, a display object obtained by modifying the display object of "2" may be indicated. In FIG. 9B, in the display area DA2B1, a display object including a letter "2" indicating a destination floor and letters "high speed" is indicated, and this display object indicates that a user moves to the second floor using a high-speed elevator. In the display area DA2B2, a display object including a letter "2" indicating a destination floor and a mark of a wheelchair is indicated, and this display object indicates that a user moves to the second floor with a wheelchair. In the display area DA2B3, a display object including a letter "2" indicating a destination floor and letters "VIP" is indicated, and this display object indicates that a user moves to the second floor by himself/herself or users move to the second floor by themselves without sharing the ride with other users.

In addition, as another modification, a modification as illustrated in FIG. 10A or 10B may be made. FIG. 10A illustrates a mode in which destination floors "1" to "3" are displayed in the first display area DA1 (DA1A to DA1C) for destination floors, respectively, and a frame line B (B1 to B3) indicating a region wider than each of the display areas is displayed. In addition, FIG. 10A also illustrates that an object has been detected in the detection region DR1A disposed corresponding to the display area DA1A. FIG. 10B illustrates that letters "ON" are displayed in the display area DA2A1 and letters "OFF" are displayed in the display area DA2A2 in response to selection of the destination floor "1". By surrounding the display object of "first floor" which is the first display object and the display object of "ON" which is the second display object with a common frame line B1 in this manner, it may be indicated that the second display object is associated with the first display object. By such a display method, it can be indicated that the second display object is a display object corresponding to the first display object even if the second display object itself does not have information of "first floor" which is the first display object.

As described above, the second display object corresponding to the first display object displayed in the second display area may be displayed in various modes as long as information of the display object displayed in the first display area can be perceived.

In step ST2, if the reception determination unit 102 does not determine that an object is present in the first group of detection regions, the process returns to step ST1.

Figure 7C:
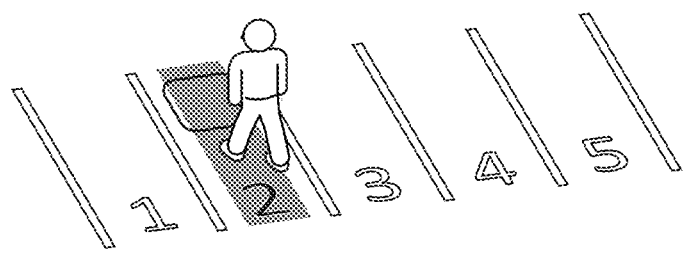

In step ST4, the reception determination unit 102 determines whether or not an object is present in the second detection region on the basis of a signal from the detection sensor 3. For example, as illustrated in FIG. 7C (see also FIG. 2), the reception determination unit 102 determines whether the display object displayed in the display area DA22 has been selected by a user. As a result, it is determined whether the destination floor "2" displayed in the display area DA22 has been selected.

Figure 7D:
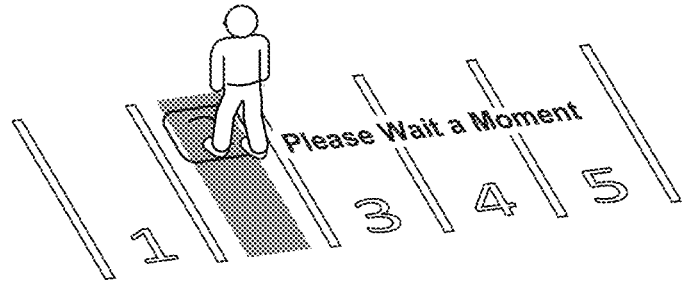
Figure 7E:
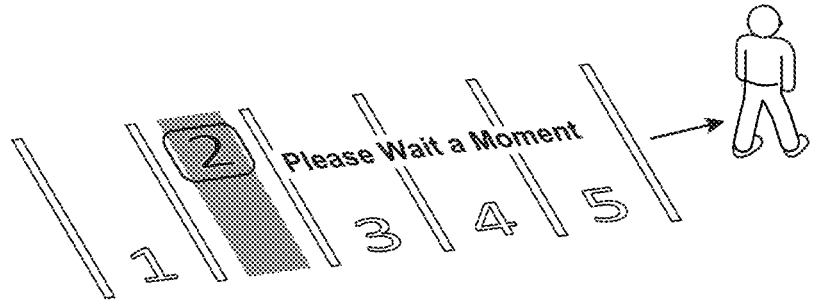

In step ST4, if the reception determination unit 102 determines that an object is present in the second detection region, in step ST5, the control signal transmitting unit 104 transmits a control signal for controlling the external device 4 to the external device 4. For example, as illustrated in FIG. 7D, in a case where it is determined that the display object "2" displayed in the display area DA22 has been selected, a control signal for taking a user to the second floor is transmitted to an elevator control device as the external device 4. Alternatively, as illustrated in FIG. 9D, in a case where it is determined that the display object (display object of 2+VIP) displayed in a display area corresponding to the detection region DR2B3 has been selected, a control signal for taking a user to the second floor alone is transmitted to the elevator control device as the external device 4. Alternatively, as illustrated in FIG. 10C, in a case where it is determined that the display object "ON" displayed in the display area DA2A1 corresponding to the detection region DR2A1 has been selected, a control signal for taking a user to the first floor is transmitted to the elevator control device as the external device 4, and a series of processes is terminated.

As described above, in a case where the reception determination unit 102 determines in a first-stage determination step (step ST2) that an object is present in the first group of detection regions, that is, in a case where the reception determination unit 102 determines that the first display object has been selected by a user, the reception determination unit 102 does not settle the determination content, and in a case where the reception determination unit 102 determines in a second-stage determination step (step ST4) that an object is present in the second detection region, that is, in a case where the reception determination unit 102 determines that the second display object has been selected by the user, the reception determination unit 102 settles the determination content of the first stage. In this way, if the second display object displayed on the basis of the first-stage determination step has a content against a user's intention, the user can be prevented from performing a motion of selecting the second display object, and therefore the system (for example, an elevator system) can be prevented from operating against the user's intention.

Note that, in a case where the second display object is a display object related to an additional operation content like "high speed", a wheelchair mark, or "VIP", the additional operation content may be settled in the second determination step, or without settlement, an additional determination step for settling the additional operation content may be provided.

If NO in step ST4, the process returns to step ST1, and the detection region setting unit 103 changes the detection region from the second detection region to the first group of detection regions. In addition, the display content setting unit 101 sets a display content corresponding to the first group of detection regions.

Although the case where the external device 4 is an elevator control device has been described above, the external device 4 may be another device. For example, the external device 4 may be a menu selection device of a restaurant. In a case where the external device 4 is a menu selection device, the projector 2 displays a menu on a table, for example, and the detection sensor 3 detects a motion by a hand or a finger of the hand. The display control device 100 performs processing such as display for settling a selected menu or transmission of a settled menu to the external device 4 depending on a detection result.

In addition, in order to notify a user that a selection motion by the user has been performed, a sound effect may be emitted when the selection motion is detected, or a display object may be highlighted.

SUPPLEMENTARY NOTES

Some of various aspects of the embodiment described above are summarized below.

Supplementary Note 1

A display control device (100) according to supplementary note 1 includes: a display content setting unit (101) that sets a display content projected by a projector (2) or displayed by a display device in such a manner that a first display object is displayed in a first display area (DA11 to DA15); and a reception determination unit (102) that receives a signal detected by a detection sensor (3) from the detection sensor and determines whether or not the first display object is selected by a user, in which the display content setting unit sets another display content projected by the projector or displayed by the display device in such a manner that a second display object corresponding to the first display object is displayed in a second display area (DA21 to DA25) different from the first display area in a case where it is determined that the first display object is selected, and the reception determination unit determines whether or not the second display object is selected, and settles the determination that the first display object is selected in a case where the reception determination unit determines that the second display object is selected.

Supplementary Note 2

A display control device according to supplementary note 2 is the display control device according to supplementary note 1, further including a detection region setting unit (103) that sets a valid detection region, in which the detection region setting unit switches the valid detection region from a detection region corresponding to the first display area to another detection region corresponding to the second display area in a case where it is determined that the first display object is selected.

Supplementary Note 3

A display control device according to supplementary note 3 is the display control device according to supplementary note 2, in which the detection region setting unit sets the valid detection region in such a manner that the valid detection region includes a region not included in the first display area.

Supplementary Note 4

A display control device according to supplementary note 4 is the display control device according to supplementary note 1, further including a detection region setting unit (103) that sets a valid detection region, in which the detection region setting unit sets the valid detection region in such a manner that the valid detection region includes a region not included in the first display area.

Supplementary Note 5

A display control device according to supplementary note 5 is the display control device according to any one of supplementary notes 1 to 4, further including a control signal transmitting unit (104) capable of transmitting a control signal for controlling an external device (4), in which the control signal transmitting unit transmits a control signal corresponding to the selection of the second display object to the external device in a case where it is determined that the second display object is selected.

Supplementary Note 6

A display control method by a display control device (100) according to supplementary note 6 includes: a step (ST1) of setting, by a display content setting unit (101), a display content projected by a projector (2) or displayed by a display device in such a manner that a first display object is displayed in a first display area (DA11 to DA15); a step (ST2) of receiving, by a reception determination unit (102), an obtained signal from a detection sensor (3) to determine whether or not the first display object is selected by a user; a step (ST3) of setting, by the display content setting unit (101), another display content projected by the projector or displayed by the display device in such a manner that a second display object corresponding to the first display object is displayed in a second display area (DA21 to DA25) different from the first display area in a case where it is determined that the first display object is selected; and a step of determining, by the reception determination unit (102), whether or not the second display object is selected to settle the determination that the first display object is selected in a case where the reception determination unit determines that the second display object is selected.

Note that the embodiments can be combined, and each of the embodiments can be appropriately modified or omitted.

INDUSTRIAL APPLICABILITY

The display control device according to the present disclosure can be used as, for example, a device that transmits a control signal to an elevator.

REFERENCE SIGNS LIST

1: database device, 2: projector, 3: detection sensor, 4: external device, 100: display control device, 100a: processing circuit, 100b: processor, 100c: memory, 101: display content setting unit, 102: reception determination unit, 103: detection region setting unit, 104: control signal transmitting unit, Sys: display control system

The invention claimed is:

1. A display control device comprising:
processing circuitry:
to set a display content projected by a projector in such a manner that a first display object is displayed in a first display area; and
to receive a signal detected by a detection sensor from the detection sensor and to determine whether or not the first display object is preliminarily selected by a user, wherein
in a case that the first display object is determined to be preliminarily selected by the user, the processing circuitry sets another display content projected by the projector in such a manner that at least one second display object corresponding to the first display object and perceivable of information of the first display object is displayed in a second display area different from the first display area in a case where it is determined that the first display object is preliminarily selected, and
the processing circuitry determines whether or not the at least one second display object is selected, and determines that the first display object is finally selected in a case where the at least one second display object is determined to be selected.

2. The display control device according to claim 1, wherein the at least one second display object is displayed in animation.

3. The display control device according to claim 1, wherein the at least one second display object includes two or more second display objects, and the two or more second display objects are displayed around the first display object.

4. The display control device according to claim 3, wherein each of the two or more second display objects includes the display content of the first display object, and a letter or mark different from the display content of the first display object.

5. The display control device according to claim 1, wherein the first display object and the at least one second display object are displayed within a common frame line.

6. The display control device according to claim 1, wherein the processing circuitry is further configured to set a valid detection region, and wherein the processing circuitry switches the valid detection region from a detection region corresponding to the first display area to another detection region corresponding to the second display area in a case where it is determined that the first display object is preliminarily selected.

7. The display control device according to claim 2, wherein the processing circuitry is further configured to set a valid detection region, and wherein the processing circuitry switches the valid detection region from a detection region corresponding to the first display area to another detection region corresponding to the second display area in a case where it is determined that the first display object is preliminarily selected.

8. The display control device according to claim 3, wherein the processing circuitry is further configured to set a valid detection region, and wherein the processing circuitry switches the valid detection region from a detection region corresponding to the first display area to another detection region corresponding to the second display area in a case where it is determined that the first display object is preliminarily selected.

9. The display control device according to claim 4, wherein the processing circuitry is further configured to set a valid detection region, and wherein the processing circuitry switches the valid detection region from a detection region corresponding to the first display area to another detection region corresponding to the second display area in a case where it is determined that the first display object is preliminarily selected.

10. The display control device according to claim 5, wherein the processing circuitry is further configured to set a valid detection region, and wherein the processing circuitry switches the valid detection region from a detection region corresponding to the first display area to another detection region corresponding to the second display area in a case where it is determined that the first display object is preliminarily selected.

11. The display control device according to claim 6, wherein
the processing circuitry sets the valid detection region in such a manner that the valid detection region includes a region not included in the first display area.

12. The display control device according to claim 1, wherein the processing circuitry is further configured to transmit a control signal to control an external device, and wherein the processing circuitry transmits a control signal corresponding to the selection of the second display object to the external device in a case where it is determined that the second display object is selected.

13. The display control device according to claim 2, wherein the processing circuitry is further configured to transmit a control signal to control an external device, and wherein the processing circuitry transmits a control signal corresponding to the selection of the second display object to the external device in a case where it is determined that the second display object is selected.

14. The display control device according to claim 3, wherein the processing circuitry is further configured to transmit a control signal to control an external device, and wherein the processing circuitry transmits a control signal corresponding to the selection of the second display object to the external device in a case where it is determined that the second display object is selected.

15. The display control device according to claim 4, wherein the processing circuitry is further configured to transmit a control signal to control an external device, and wherein the processing circuitry transmits a control signal corresponding to the selection of the second display object to the external device in a case where it is determined that the second display object is selected.

16. The display control device according to claim 5, wherein the processing circuitry is further configured to transmit a control signal to control an external device, and wherein the processing circuitry transmits a control signal corresponding to the selection of the second display object to the external device in a case where it is determined that the second display object is selected.

17. The display control device according to claim 6, wherein the processing circuitry is further configured to transmit a control signal to control an external device, and wherein the processing circuitry transmits a control signal corresponding to the selection of the second display object to the external device in a case where it is determined that the second display object is selected.

18. The display control device according to claim 7, wherein the processing circuitry is further configured to transmit a control signal to control an external device, and wherein the processing circuitry transmits a control signal corresponding to the selection of the second display object to the external device in a case where it is determined that the second display object is selected.

19. A display control method by a display control device, the method comprising:
setting a display content projected by a projector in such a manner that a first display object is displayed in a first display area;
receiving an obtained signal from a detection sensor to determine whether or not the first display object is preliminarily selected by a user;
in a case that the first display object is determined to be preliminarily selected by the user, setting another display content projected by the projector in such a manner that a second display object corresponding to the first display object and perceivable of information of the first display object is displayed in a second display area different from the first display area in a case where it is determined that the first display object is preliminarily selected; and
determining whether or not the second display object is selected to determine that the first display object is finally selected in a case where the second display object is determined to be selected.

* * * * *